US012659154B2

(12) United States Patent
Annamalai et al.

(10) Patent No.: US 12,659,154 B2
(45) Date of Patent: Jun. 16, 2026

(54) SYSTEMS AND METHODS FOR IMAGE AUTHENTICATED DATA TRANSFERS BETWEEN ELECTRONIC DEVICES IN A DISTRIBUTED NETWORK

(71) Applicant: BANK OF AMERICA CORPORATION, Charlotte, NC (US)

(72) Inventors: Shanthini Devi Annamalai, Chennai (IN); Durgesh Singh Yadav, Gautam Buddha Nagar (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 379 days.

(21) Appl. No.: 18/219,838

(22) Filed: Jul. 10, 2023

(65) Prior Publication Data

US 2025/0023730 A1     Jan. 16, 2025

(51) Int. Cl.
 *H04L 29/06*     (2006.01)
 *H04L 9/32*     (2006.01)
(52) U.S. Cl.
 CPC ..................................... *H04L 9/32* (2013.01)
(58) Field of Classification Search
 None
 See application file for complete search history.

(56) References Cited

U.S. PATENT DOCUMENTS

| | | | | |
|---|---|---|---|---|
| 7,421,581 B2 * | 9/2008 | Alasia | .................... | G06T 1/005 |
| | | | | 713/168 |
| 7,552,467 B2 * | 6/2009 | Lindsay | ............... | G07F 7/1025 |
| | | | | 713/168 |
| 8,726,355 B2 * | 5/2014 | Shuster | ............... | H04L 63/1416 |
| | | | | 713/168 |
| 8,751,829 B2 * | 6/2014 | Vysogorets | ............. | G06F 21/34 |
| | | | | 713/168 |

(Continued)

OTHER PUBLICATIONS

Ku, Wei-Chin et al. A Fragile Watermarking Scheme for Image Authentication with Tamper Detection and Localization. 2010 Fourth International Conference on Genetic and Evolutionary Computing. https://ieeexplore.ieee.org/stamp/stamp.jsp?tp=&arnumber= 5715513 (Year: 2010).*

(Continued)

*Primary Examiner* — Jeremiah L Avery
(74) *Attorney, Agent, or Firm* — Moore & Van Allen PLLC; Lauren M. Stokes

(57)     ABSTRACT

Systems, methods, and computer program products are provided herein for image authenticated data transfers between electronic devices in a distributed network. An example method includes receiving a request for data transfer from a first user device associated with a first user that defines one or more data transfer parameters and determining a second user associated with the data transfer request based upon the one or more data transfer parameters. The method also includes determining a verifiable image object associated with the second user that includes at least a digital (Continued)

DETERMINE THE VERIFIABLE IMAGE OBJECT ASSOCIATED WITH THE SECOND USER
402

CAUSE THE SECOND USER DEVICE TO PERFORM AN IMAGE CAPTURE OPERATION THAT GENERATES THE VERIFIABLE IMAGE OBJECT
404

ACCESS A DATABASE STORING VERIFIABLE IMAGE OBJECTS ASSOCIATED WITH A PLURALITY OF USERS.
406

AUTHENTICATE THE DATA TRANSFER BETWEEN THE FIRST USER DEVICE AND A SECOND USER DEVICE IN RESPONSE TO AN AUTHENTICATION OPERATION BY THE FIRST USER BASED UPON THE VERIFIABLE IMAGE OBJECT
408 representation of the second user. The method further includes authenticating the data transfer between the first user device and a second user device associated with the second user in response to an authentication operation by the first user based upon the verifiable image object.

19 Claims, 6 Drawing Sheets

(56) References Cited

U.S. PATENT DOCUMENTS

| | | | | |
|---|---|---|---|---|
| 8,838,970 | B1 * | 9/2014 | Suresh | H04L 63/08 |
| | | | | 713/168 |
| 8,839,391 | B2 * | 9/2014 | Vysogorets | G06F 21/34 |
| | | | | 713/168 |
| 8,843,997 | B1 * | 9/2014 | Hare | H04L 63/0815 |
| | | | | 709/200 |
| 9,154,480 | B1 * | 10/2015 | Juels | H04L 9/3271 |
| 10,164,975 | B1 * | 12/2018 | Son | G06K 19/06103 |
| 11,290,274 | B2 * | 3/2022 | Melzer | H04L 63/0428 |
| 11,622,257 | B1 * | 4/2023 | Mars | H04W 8/06 |
| | | | | 455/41.2 |
| 11,633,119 | B2 * | 4/2023 | Dormer | A61B 5/0263 |
| | | | | 713/168 |
| 11,789,723 | B2 * | 10/2023 | Suarez | G06F 8/63 |
| | | | | 713/168 |
| 2014/0372754 | A1 * | 12/2014 | Aissi | H04L 9/0861 |
| | | | | 713/168 |
| 2015/0249647 | A1 * | 9/2015 | Mityagin | H04L 67/1095 |
| | | | | 713/168 |
| 2015/0341333 | A1 * | 11/2015 | Feng | H04L 9/3297 |
| | | | | 713/168 |
| 2016/0191513 | A1 * | 6/2016 | Tomlinson | H04L 9/321 |
| | | | | 713/168 |
| 2020/0057664 | A1 * | 2/2020 | Durham | G06F 21/53 |

OTHER PUBLICATIONS

Chang, H. et al. Multispectral Fusion for Indoor and Outdoor Face Authentication. 2006 Biometrics Symposium: Special Session on Research at the Biometric Consortium Conference. https://ieeexplore.ieee.org/stamp/stamp.jsp?tp=&arnumber=4341616 (Year: 2006).*

Hu, Yu-Ping; Han, De-Zhi. Using two semi-fragile watermark for image authentication. 2005 International Conference on Machine Learning and Cybernetics. https://ieeexplore.ieee.org/stamp/stamp.jsp?tp=&arnumber=1527913 (Year: 2005).*

* cited by examiner

RECEIVE A REQUEST FOR DATA TRANSFER FROM A FIRST USER DEVICE ASSOCIATED WITH A FIRST USER THAT DEFINES ONE OR MORE DATA TRANSFER PARAMETERS
202

ACCESS ONE OR MORE PRIOR INTERACTIONS BETWEEN THE FIRST USER DEVICE AND A SECOND USER DEVICE
204

DETERMINE A SECOND USER ASSOCIATED WITH THE DATA TRANSFER REQUEST BASED UPON THE ONE OR MORE DATA TRANSFER PARAMETERS
206

DETERMINE A VERIFIABLE IMAGE OBJECT ASSOCIATED WITH THE SECOND USER THAT INCLUDES AT LEAST A DIGITAL REPRESENTATION OF THE SECOND USER
208

RENDER THE VERIFIABLE IMAGE OBJECT ON A DISPLAY OF THE FIRST USER DEVICE
210

AUTHENTICATE THE DATA TRANSFER BETWEEN THE FIRST USER DEVICE AND THE SECOND USER DEVICE IN RESPONSE TO AN AUTHENTICATION OPERATION BY THE FIRST USER BASED UPON THE VERIFIABLE IMAGE OBJECT
212

FIG. 2

RECEIVE A REQUEST FOR DATA TRANSFER ASSOCIATED WITH AN EXISTING
SESSION BETWEEN THE FIRST USER DEVICE AND THE SECOND USER DEVICE
302

CAUSE PRESENTATION OF THE VERIFIABLE IMAGE OBJECT ON A DISPLAY OF THE
FIRST USER DEVICE
304

RECEIVE ONE OR MORE USER INPUTS VIA A PLURALITY OF INPUT OBJECTS
PROVIDED ON THE DISPLAY
306

AUTHENTICATE THE DATA TRANSFER BETWEEN THE FIRST USER DEVICE AND
THE SECOND USER DEVICE IN RESPONSE TO THE ONE OR MORE USER INPUTS
OPERATING AS THE AUTHENTICATION OPERATION
308

ITERATIVELY AUTHENTICATE THE EXISTING SESSION BETWEEN THE FIRST USER
DEVICE AND THE SECOND USER DEVICE BASED ON ITERATIVE AUTHENTICATION
OPERATIONS BY THE FIRST USER
310

FIG. 3

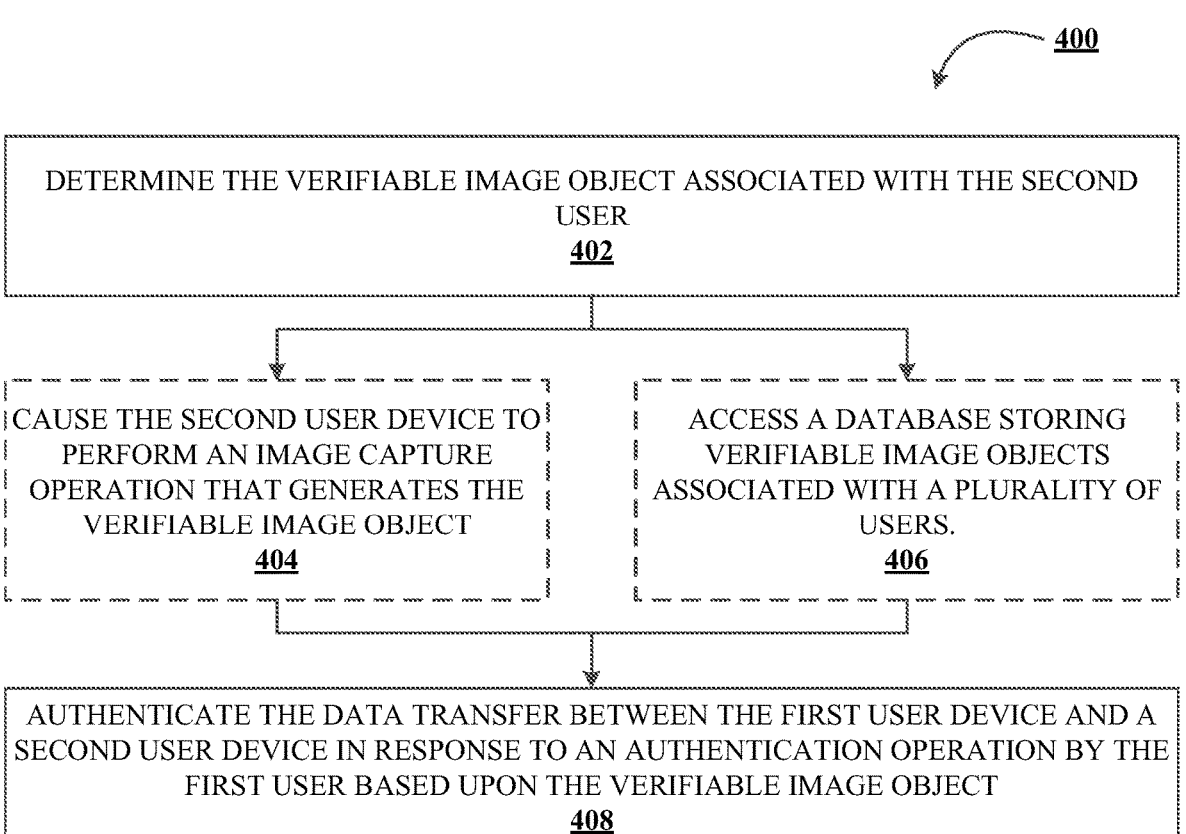

400

DETERMINE THE VERIFIABLE IMAGE OBJECT ASSOCIATED WITH THE SECOND USER
402

CAUSE THE SECOND USER DEVICE TO PERFORM AN IMAGE CAPTURE OPERATION THAT GENERATES THE VERIFIABLE IMAGE OBJECT
404

ACCESS A DATABASE STORING VERIFIABLE IMAGE OBJECTS ASSOCIATED WITH A PLURALITY OF USERS.
406

AUTHENTICATE THE DATA TRANSFER BETWEEN THE FIRST USER DEVICE AND A SECOND USER DEVICE IN RESPONSE TO AN AUTHENTICATION OPERATION BY THE FIRST USER BASED UPON THE VERIFIABLE IMAGE OBJECT
408

FIG. 4

SYSTEMS AND METHODS FOR IMAGE AUTHENTICATED DATA TRANSFERS BETWEEN ELECTRONIC DEVICES IN A DISTRIBUTED NETWORK

TECHNOLOGICAL FIELD

Example embodiments of the present disclosure relate generally to device authentication and, more particularly, to systems and methods for image authenticated data transfers between electronic devices.

BACKGROUND

Electronic networks, communication systems, computing devices, and other systems may authenticate or otherwise verify devices and associated users that interact with these systems. The advent of peer-to-peer device interactions and associated data transfers have provided additional complexity in the authentication operations of these systems. Applicant has identified a number of deficiencies and problems associated with conventional authentication systems and associated methods. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided herein for image authenticated data transfers between electronic devices in a distributed network. In one aspect, a system for image authenticated data transfers between electronic devices in a distributed network may include at least one non-transitory storage device and at least one processor coupled to the at least one non-transitory storage device. The at least one processor may receive a request for data transfer from a first user device associated with a first user where the data transfer request defines one or more data transfer parameters and determine a second user associated with the data transfer request based upon the one or more data transfer parameters. The processor may also determine a verifiable image object associated with the second user where the verifiable image object includes at least a digital representation of the second user. The processor may further authenticate the data transfer between the first user device and a second user device associated with the second user in response to an authentication operation by the first user based upon the verifiable image object.

In some embodiments, the at least one processor may be further configured to cause the first user device to render the verifiable image object on a display of the first user device.

In some embodiments, in determining a second user associated with the data transfer request, the at least one processor may be further configured to access one or more prior interactions between the first user device and the second user device.

In some embodiments, the request for data transfer of the first user device may be associated with an existing session between the first user device and the second user device.

In some further embodiments, the at least one processor may be further configured to cause presentation of the verifiable image object on a display of the first user device, receive one or more user inputs via a plurality of input objects provided on the display, and authenticate the data transfer between the first user device and a second user device associated with the second user in response to the one or more user inputs operating as the authentication operation.

In some further embodiments, the at least one processor may be further configured to iteratively authenticate the existing session between the first user device and the second user device based on iterative authentication operations by the first user responsive to iterative determinations of verifiable image objects associated with the second user during a time period associated with the existing session.

In some embodiments, the at least one processor may be further configured to halt the existing session between the first user device and the second user device in the absence of an authentication operation by the first user.

In determining the verifiable image object associated with the second user, in some embodiments, the at least one processor may be further configured to cause the second user device to perform an image capture operation that generates the verifiable image object.

Additionally or alternatively, in some embodiments, in determining the verifiable image object associated with the second user, the at least one processor may be further configured to access a database storing verifiable image objects associated with a plurality of users.

In another aspect, a computer program product for image authenticated data transfers between electronic devices in a distributed network is provided. The computer program product may include a non-transitory computer-readable medium comprising code. The code, when executed, may cause an apparatus to receive a request for data transfer from a first user device associated with a first user that defines one or more data transfer parameters, determine a second user associated with the data transfer request based upon the one or more data transfer parameters, determine a verifiable image object associated with the second user that includes at least a digital representation of the second user, and authenticate the data transfer between the first user device and a second user device associated with the second user in response to an authentication operation by the first user based upon the verifiable image object.

In another aspect, a method for image authenticated data transfers between electronic devices in a distributed network is provided. The method may include receiving a request for data transfer from a first user device associated with a first user that defines one or more data transfer parameters, determining a second user associated with the data transfer request based upon the one or more data transfer parameters, determining a verifiable image object associated with the second user that includes at least a digital representation of the second user, and authenticating the data transfer between the first user device and a second user device associated with the second user in response to an authentication operation by the first user based upon the verifiable image object.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 2 illustrates a method for image authenticated data transfers between electronic devices in a distributed network in accordance with one or more embodiments of the present disclosure;

FIG. 3 illustrates a method for image authenticated data transfers for existing device sessions in accordance with one or more embodiments of the present disclosure; and FIG. 4 illustrates a method for verifiable image object generation in accordance with one or more embodiments of the present disclosure

DETAILED DESCRIPTION

Figure 1A:
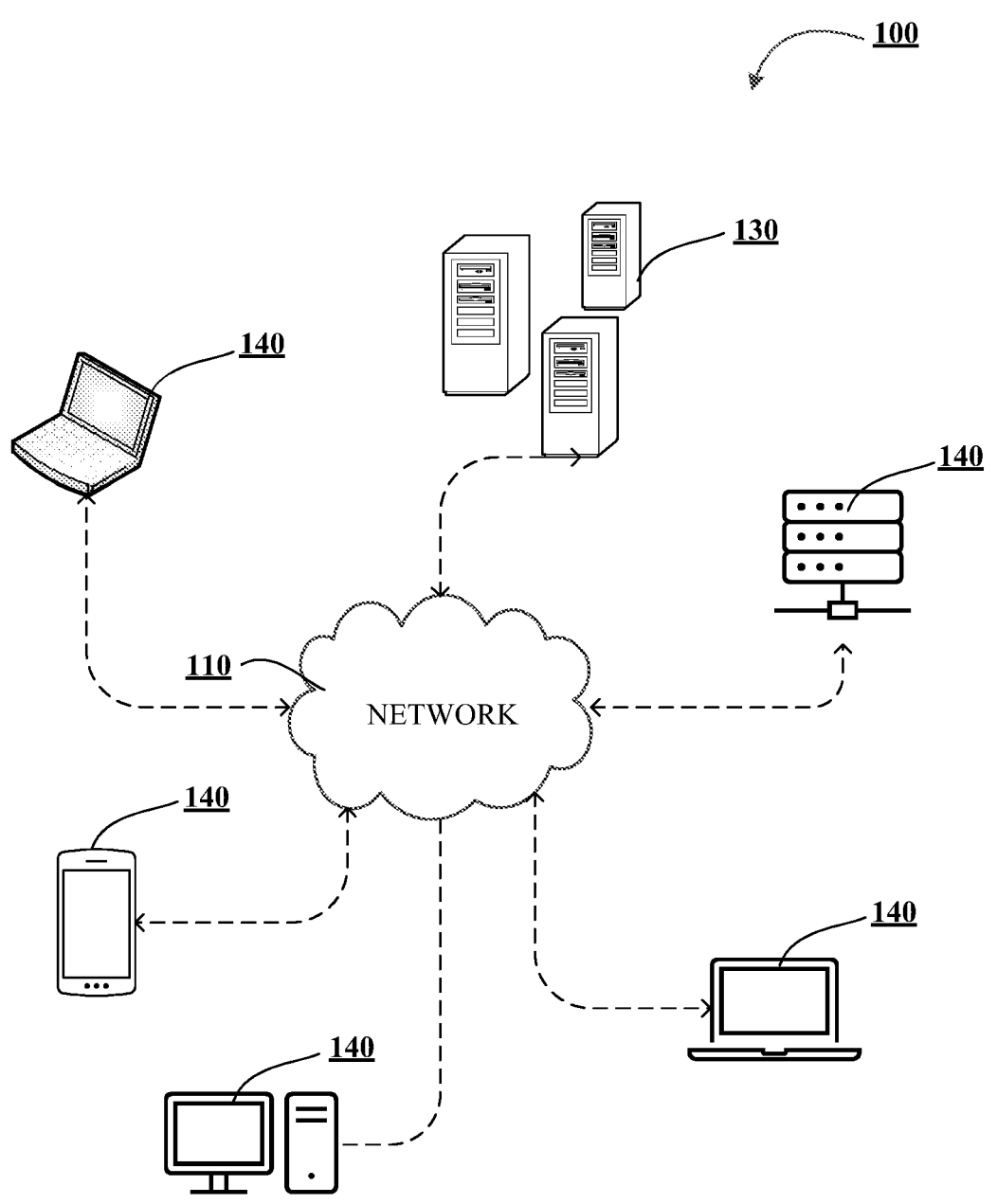
FIGS. 1A-1C illustrate technical components of an exemplary distributed computing environment for image authenticated data transfers between electronic devices in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interacting with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. Although described hereinafter with reference to a first user and associated first user device interacting with an example system, the present disclosure contemplates that any number of users and associated user devices may interact with the systems described herein without limitation.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. As described hereinafter, the systems of the present disclosure may be associated with the rendering or display of user input objects on a display of a user device. The present disclosure contemplates that the arrangement, presentation, organization, etc. of the user interfaces and/or input objects described herein may vary based upon the intended application of the system, the nature of the verifiable image object, and/or the like.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may be permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, a system and an application, an accessing of stored data by one or more nodes of a computing cluster, a transmission of a requested task, or the like. As described hereinafter, an "interaction" between the system and one or more applications may be permissioned in that the ability for the system (e.g., one or more devices, subsystems, modules, etc.) to access a particular application may be controlled by permissions issued by this application. By way of a non-limiting example, a system of the present disclosure may be configured to establish an authenticated session between user devices. In such an example, an interaction may refer to the communication and/or transfer of data used by the respective user devices to establish this authenticated session.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, electronic networks, communication systems, computing devices, and other systems may authenticate or otherwise verify devices and associated users that interact with these systems. For example, a user and/or associated user device may be required to provide various account credentials, passwords, biometric inputs, etc. in order to verify the identity of the user and/or user device accessing these systems. The advent of peer-to-peer device interactions and associated data transfers have provided additional complexity in the authentication operations of these systems. For example, a first user attempting to establish an authenticated session for data transfer with a second user may provide one or more account credentials or other data associated with the first user. Traditional authentication systems, however, fail to provide a mechanism by which the first user may ensure that the second user of the authenticated session is the intended user with which the first user intends to interact.

In order to solve these issues and others, embodiments of the present disclosure provide systems and methods for image authenticated data transfers between electronic devices in a distributed network. An example system may receive a request for data transfer from a first user device associated with a first user that defines one or more data transfer parameters and determines a second user associated with the data transfer request based upon the one or more data transfer parameters with which to establish an authenticated session. The system may then determine a verifiable image object associated with the second user that includes at least a digital representation of the second user (e.g., an image, photo, etc. of the user). In some instances, the verifiable image object may be generated in response to performance of an image capture operation by the second user device (e.g., a mobile phone of the second user) or in response to accessing a database storing verifiable image objects associated with a plurality of users. The system may subsequently authenticate the data transfer between the first user device and a second user device associated with the second user in response to an authentication operation by the first user (e.g., a verification by the first user of the image associated with the second user).

Example System and Circuitry Components

Figure 1B:
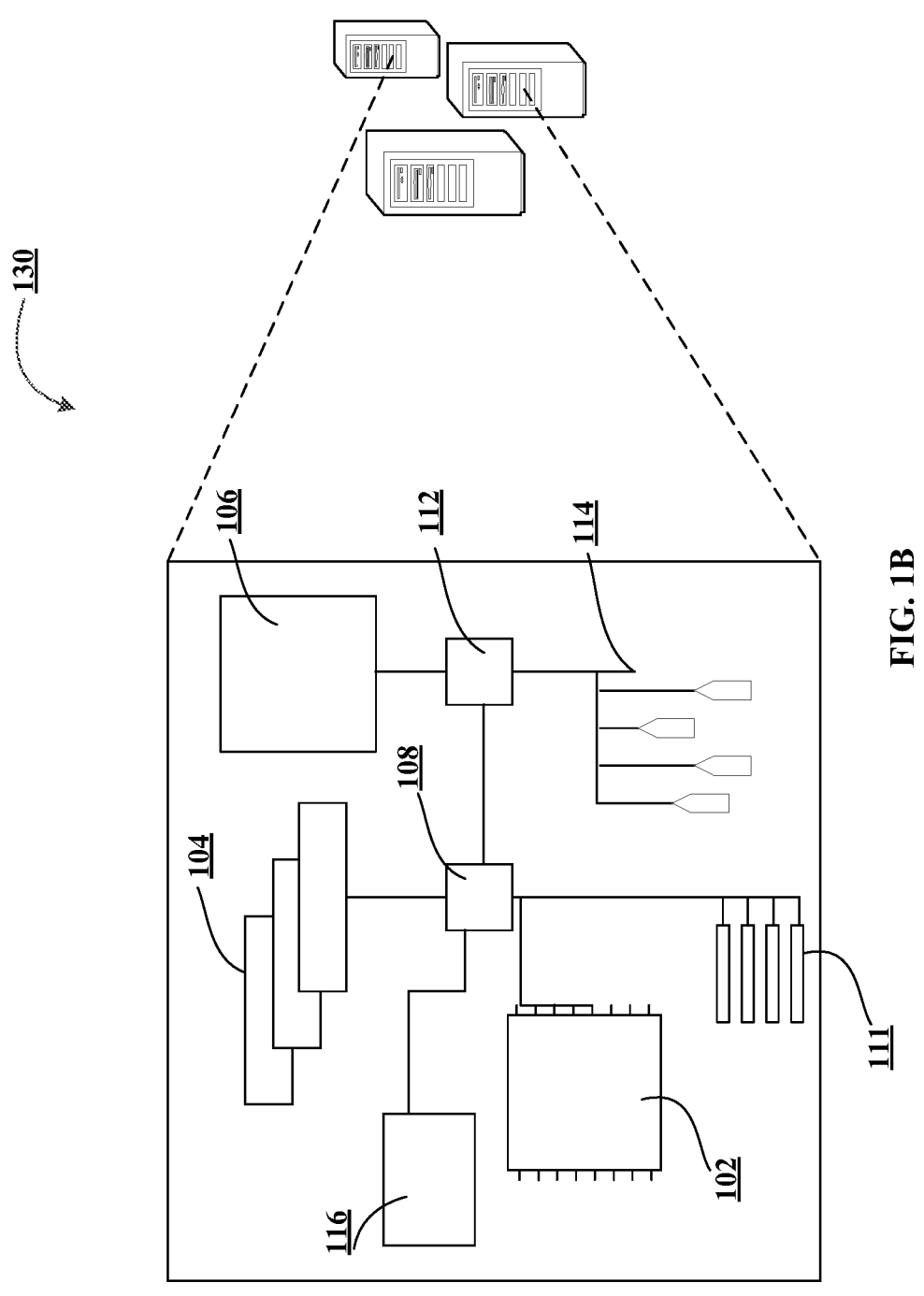
Figure 1C:
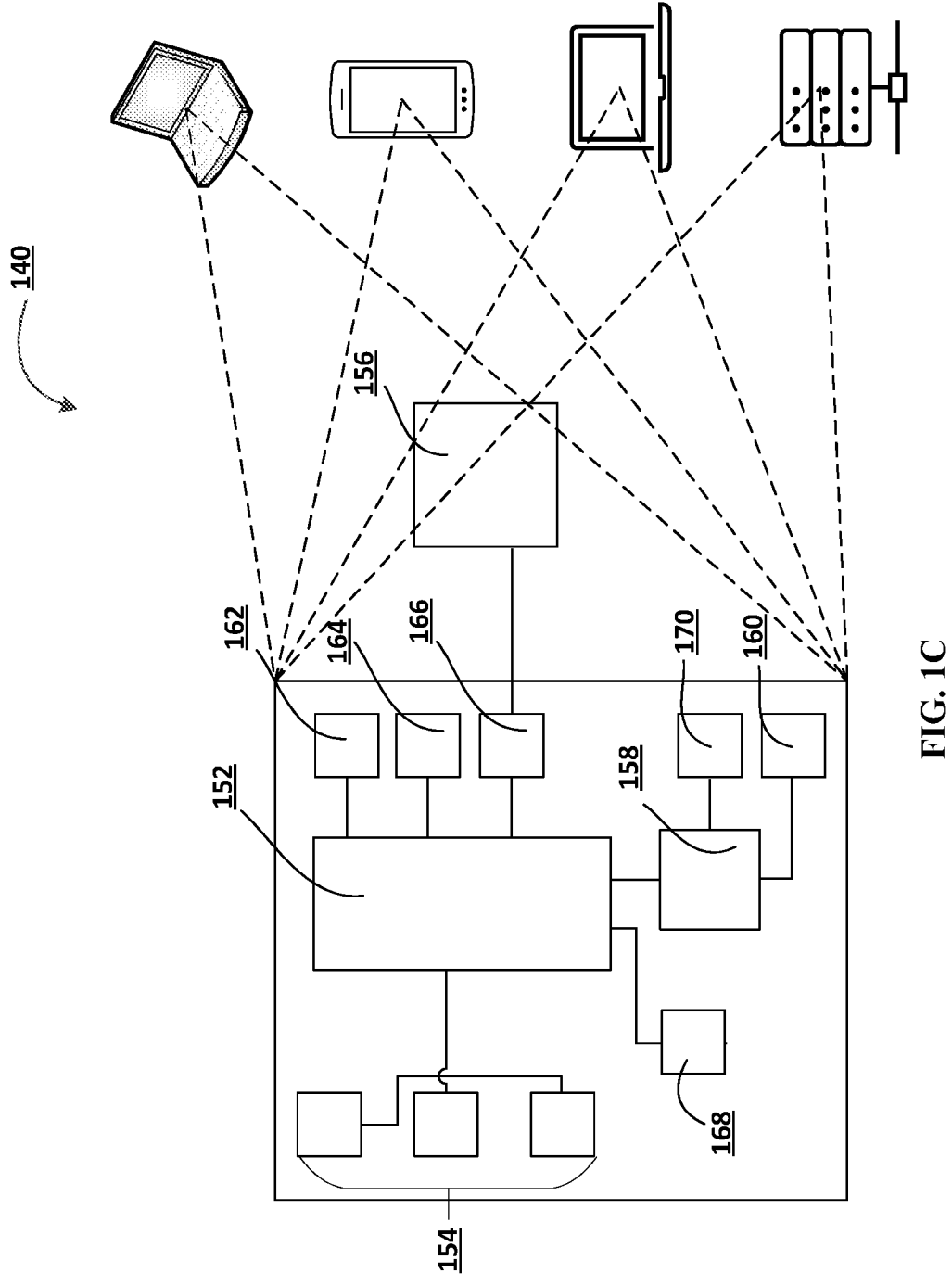

FIGS. 1A-1C illustrate technical components of an exemplary distributed computing environment for image authenticated data transfers between electronic devices in a distributed network 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon. The system 130 may represent various forms of servers, such as web servers, database servers, file server, or the like, various forms of digital computing devices, such as laptops, desktops, video recorders, audio/video players, radios, workstations, virtual reality devices, augmented reality device, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, virtual reality devices, augmented reality device, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), a peer-to-peer network, the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and/or a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein. In some embodiments, the processor 102 may further include circuitry components configured to cause one or more end-point device(s) 140 to perform an image capture operation. For example, the processor 102 may alone, or in combination with one or more of the devices or components illustrated in FIGS. 1A-1C, include hardware components configured to perform image capture operations that generate the verifiable image objects described herein. In some embodiments, the system 130 may include circuitry components (e.g., cameras, imagers, hyperspectral imaging devices, etc.) that may capture an image of the one or more users described herein (e.g., perform an image capture operation). In other embodiments, the user devices associated with respective users (e.g., a first user device associated with a first user, a second user device associated with a second user, etc.) may be configured to perform image capture operations that generate the verifiable image objects. Although described herein with reference to a digital representation of the second user (e.g., at least an image of the second user), the present disclosure contemplates that the verifiable image object may further include any other type of data (e.g., text, sound, computer-generated images, etc.), alone or in combination with the image (e.g., picture, video, etc.) of the second user.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The end-point device(s) 140 may, in some embodiments, refer to the user devices associated with respective users that may be connected in an authenticated session such that data may be transferred therebetween. By way of continued example, in some embodiments, the user devices (e.g., end-point device(s) 140) may include circuitry components (e.g., cameras, imagers, hyperspectral imagining devices, etc.) configured to generate image data in response to an image capture operation by these circuitry components. This image data may be used, in whole or in part, to generate the verifiable image object associated with the particular user. For example, the systems described herein may cause a user device associated with a particular user to capture images (e.g., discretely, continuously, etc.) of the associated user as a mechanism for verifying the identity of the user associated with the user device. The present disclosure therefore contemplates that each of the devices described herein may include any components configured to generate image data for use as a verifiable image object without limitation.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, virtual reality environments, and/or any of the components described herein. To this end, the system 130 may trigger an authentication subsystem that may require the user (or process) to provide authentication credentials to determine whether the user (or process) is eligible to access the protected resources. As described hereinafter, the embodiments of the present disclosure may leverage verifiable image objects, alone or in combination with other user credentials, to authenticate an interaction between user devices. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, VR/AR devices, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Example Methods For Image Authenticated Data Transfers

FIG. 2 illustrates a flowchart containing a series of operations for image authenticated data transfers between electronic devices in a distributed network (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 202, the system 130 may be configured to receive a request for data transfer from a first user device associated with a first user. As described above, the system 130 of the present application may be configured to control device authentication for data transfers, such as between user devices (e.g., between a first user device and a second user device). By way of a non-limiting example described hereinafter, the first user may request a data transfer that is associated with a resource transfer between the first user and the second user. In some embodiments, the request received at operation 202 may be received from the first user device. For example, a first user may, via a user interface presented on the first user device, provide an input requesting data transfer that is partially managed or otherwise associated with the system 130. In other embodiments, such as embodiments in which the first user device is accessing an existing session between the first user device and the second user device, the request received at operation 202 may refer to the iterative authentication operations of FIG. 3 performed to continuously authenticate the interaction between the first user device and the second user device.

In some embodiments, the operations of FIG. 2 may be performed as part of an initial request to establish an authenticated session between the first user device and the second user device. By way of an example, the first user may initially be disconnected from (i.e., or otherwise not accessing) an authenticated session. In such an embodiment, the operations of FIG. 2 may be performed as part of an initialization or initial authentication procedure to establish the authenticated session (e.g., initially authenticate the first user device). In other embodiments, the operations of FIG. 2 may be performed as part of an iterative process for continuously authenticating the first user device during an authenticated session, such as described hereafter with reference to FIG. 3. By way of example, an authenticated session between the first user device and the second user device may exist at the time of performance of operation 202. As such, the receipt of the request for data transfer may be iteratively provided to the system 130 during a time period associated with the existing session between the first user device and the second user device. In some instances, the first user device may iteratively transmit a request for data transfer during the existing session between the first user device and the second user device. In other instances, the system 130 may iteratively transmit a request to the first user device and/or the second user device to prompt a user input for authentication credentials, image verification, etc. as described hereafter.

The data transfer request received at operation 202 may define one or more data transfer parameters. As described above, an interaction associated with the system 130 and the end-point device(s) 140 may be permissioned in that the ability for the first user device to establish an authenticated session with the second user device may be controlled by permissions issued by the system 130. In order to verify that the first user device is associated with the first user and that the first user and first user device have permission to establish an authenticated session, one or more parameters, characteristics, attributes, etc. (e.g., data transfer parameters) of the first user device and/or the first user may be required. Said differently, the first user and/or the first user device may be required to provide authentication credentials (e.g., usernames, passwords, device characteristics, biometric inputs, etc.) that identify the first user and the first user device to the system 130. The present disclosure contemplates that the authentication credentials (e.g., data transfer parameters) described herein may include any feature, input, characteristic, attribute, parameter, and/or the like associated with the first user and/or first user device based upon the intended application of the system 130 and/or the nature of the session to be established with the second user device.

In some embodiments, the one or more data transfer parameters may be further identify or otherwise be associated with the second user. By way of continued example, the request for data transfer may be associated with a request for resource transfer (e.g., a transfer of funds or the like) between the first user and the second user. As such the one or more data transfer parameters may include data (e.g., usernames, device characteristics, contact numbers, etc.) that at least partially identify the second user to the system 130. Although described herein with reference to usernames, device characteristics of the second user device, a contact number (e.g., mobile telephone number or the like), etc. for the second user, the present disclosure contemplates that any data indicative of the second user may be leveraged by the system 130.

In some embodiments, as shown in operation 204 the system 130 may be configured to access one or more prior interactions between the first user device and the second user device. By way of example, the system 130 may be periodically accessed by the first user device, the second user device, and/or any other devices associated with the first and second users. In one or more of these interactions, the system 130 may generate data associated with the first and second users and may store this data, for example, in a database or other repository. Additionally or alternatively, in some embodiments, the system 130 may have permission (e.g., used provided permission) to access electronic interactions (e.g., text messages, phone calls, online interactions and messaging, recent sender account data, and/or the like) that may be analyzed to identify the second user and/or second user device.

Thereafter, as shown in operation 206, the system 130 may be configured to determine a second user associated with the data transfer request based upon the one or more data transfer parameters. By way of continued example, the request for data transfer may be associated with a request for resource transfer (e.g., funds or the like) between the first user and the second user. In some instances, the one or more data transfer parameters defined by the data transfer request may explicitly identify the second user and/or the second user device. In other instances, the one or more data transfer parameters may implicitly identify the second user and/or the second user device, such as attributes of the second user that, when combined with additional data of the system 130, indicate the identity of the second user. The present disclosure contemplates that the system 130 may leverage data of any type, from any source, etc. to identify the second user and/or the second user device.

Thereafter, as shown in operation 208, the system 130 may further be configured to determine a verifiable image object associated with the second user where the verifiable image object comprises at least a digital representation of the second user. As described above, the advent of peer-to-peer interactions have increased the complexity associated with establishing authenticated sessions between user devices. By way of a non-limiting example, the first user may request a data transfer with the second user that is associated with a resource transfer (e.g., funds or the like). Although the first user may provide data transfer parameters that at least partially identify the intended user (e.g., the second user), further verification of the identity of the second user may be required to ensure an authenticated interaction with the appropriate party (e.g., the second user). As such, the embodiments of the present disclosure may leverage verifiable image objects that include at least a digital representation (e.g., an image or equivalent) of the second user that may be reviewed by the first user.

The verifiable image objects described herein may refer to a collection of data entries indicative of or associated with an image of the second user. In some embodiments, for example, the verifiable image object may refer to an image, picture, video, and/or the like that is a digital representation of the physical embodiment of the second user. By way of a non-limiting example, the verifiable image object may comprise data that, when rendered, illustrates an image of the face of the second user for view by the first user as described herein. Although described herein with reference to an image of the second user, the present disclosure contemplates that any data entries associated with the second user may be used by the embodiments herein as the verifiable image object. For example, the present disclosure contemplates that any feature, attribute, etc. (e.g., passcode, aliases, location, voice recording, etc.) by which the first user may verify the identity of the second user may be used without limitation. In some embodiments, the verifiable image object may include an image of the second user that is presented in combination with one or more other features, attributes, etc. to the first user for review (e.g., a facial image of the second user with an overlayed passcode).

In some embodiments, as shown in operation 210, the system 130 may further be configured to cause the first device to render the verifiable image object on a display of the first user device. As described above, in some embodiments, the first user device (e.g., the end-point device(s) 140) may include circuitry components configured to, alone or in combination with the system 130, render the verifiable image object for viewing by the first user. For example, the system 130 may transmit instructions to the first user device causing the first user device to render the verifiable image object. As would be evident to one of ordinary skill in the art in light of the present disclosure, the first user device associated with the first user may include any component, device, circuitry, etc. for providing the verifiable image object to the first user (e.g., visually or otherwise) for review. Furthermore, the present disclosure contemplates that the data type associated with the verifiable image object may impact the way in which the verifiable image object is provided to the user. By way of example, in an instance in which the verifiable image object further includes data configured to provide a sound based portion (e.g., a voice recording or the like) of the verifiable image object to the first user, the first user device may leverage a speaker or the like to present the sound based portion to the first user.

As described hereafter with reference to FIG. 4, in some embodiments, the system 130 may access a database storing verifiable image objects associated with a plurality of users. By way of example, users that interact with the system 130 may provide images or other digital representations that identify the underlying user associated with the images. The example database, for example, may store user pictures that are supplied to the system 130 as part of an initialization or other sign-up procedure. The system 130 may, in response to a request for data transfer that includes the second user, query the database to receive verifiable image objects stored by the database that are associated with the second user. Additionally or alternatively, as also described with reference to FIG. 4, the system 130 may cause the second user device to perform an image capture operation that generates the verifiable image object. For example, the system 130 may transmit instructions to the second user device that causes the second user device to capture an image of the second user. The image of the second user (e.g., the image data of the second user generated by the image capture operation) may be, in whole or in part, used to generate the verifiable image object.

Thereafter, as shown in operation 212, the system 130 may be configured to authenticate the data transfer between the first user device and a second user device associated with the second user in response to an authentication operation by the first user based upon the verifiable image object. By way of continued example, the system 130 may transmit instructions to the first user device that causes the first user device to render (e.g., via a display) or otherwise present the verifiable image object to the first user. For example, the digital representation (e.g., a digital image) of the second user defined by the data entries forming the verifiable image object may be presented to the first user for review to verify that the digital image corresponds to the intended user with which the first user intends to interact. As described hereafter with reference to FIG. 3, the first user device may provide one or more or more input objects on a display of the first user device. The one or more input objects may receive one or more user inputs (e.g., an approval input) that operates as the authentication operation (e.g., an operation that verifies the identity of the second user). The present disclosure contemplates that any input by the first user responsive to the verifiable image object may operate as the authentication operation that represents the first user's approval to establish an authenticated session with the second user device.

FIG. 3 illustrates a flowchart containing a series of operations for image authenticated data transfers for existing device sessions (e.g., method 300). The operations illustrated in FIG. 3 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 302, the system 130 may be configured to receive a request for data transfer from a first user device associated with an existing session between the first user device and the second user device. As described above, in some embodiments, the first user device may be accessing an existing session between the first user device and the second user device, such that the authentication operations described here refer to a continuous authentication procedure. By way of continued example, an authenticated session between the first user device and the second user device may have been previously authenticated by the operations of FIG. 2. As such, the receipt of the request for data transfer may be iteratively provided to the system 130 during a time period associated with the existing session between the first user device and the second user device. As described above, in some instances, the first user device may iteratively transmit a request for data transfer during the existing session between the first user device and the second user device. In other instances, the system 130 may iteratively transmit a request to the first user device and/or the second user device to prompt a user input for authentication credentials, image verification, etc. as described herein.

As shown in operation 304, the system 130 may be configured to cause presentation of the verifiable image object on a display of the first user device. As described above with reference to operation 210, the first user device (e.g., the end-point device(s) 140) may include circuitry components configured to, alone or in combination with the system 130, render the verifiable image object for viewing by the first user. For example, the system 130 may transmit instructions to the first user device causing the first user device to render the verifiable image object. By way of continued example, the request for data transfer may be associated with a request for resource (e.g., funds or the like) transfer such that the verifiable image object is used for verifying the identity of the second user and associated second user device for proper resource transfer. In the continuous authentication embodiment of FIG. 3, the presentation of the verifiable image object on a display of the first user device may refer to the iterative presentation of verifiable image object to continuously ensure the identity of the second user. By way of example, images, video, and/or other digital representations of the second user may be iteratively provided to the first user device during the existing session between the first user device and the second user device to provide the first user the ability to iteratively verify that the second user is the party with which the first user intends to interact.

Thereafter, as shown in operation 306, the system 130 may be configured to receive one or more user inputs via a plurality of input objects provided on the display. By way of example, the system 130 may cause presentation of a plurality of input objects on the display of the first user device that are configured to receive one or more user inputs, such as a user input by the first user that approves or rejects the interaction (e.g., the authenticated session) with the second user. In an instance in which the one or more user inputs reject or otherwise fail to verify the identity of the second user, the system 130 may halt the existing session between the first user device and the second user device. In other words, the system 130 may, in a continuous authentication implementation or otherwise, prevent an interaction with an unverified user in response to the absence of an authentication operation by the first user (e.g., an explicit rejection or failure to approve). The present disclosure contemplates that the system 130 may leverage any mechanism, technique, etc. to preclude or halt access to the authenticated session by the user devices described herein.

Thereafter, as shown in operation 308, the system 130 may be configured to authenticate the data transfer between the first user device and a second user device associated with the second user in response to the one or more user inputs operating as the authentication operation. As described above with reference to operation 212, the digital representation (e.g., a digital image) of the second user defined by the data entries forming the verifiable image object may be presented to the first user for review to verify that the digital image corresponds to the intended user with which the first user intends to interact. The one or more input objects may receive one or more user inputs (e.g., an approval input) that operates as the authentication operation (e.g., an operation that verifies the identity of the second user). The present disclosure contemplates that any input by the first user responsive to the verifiable image object may operate as the authentication operation that represents the first user's approval to establish an authenticated session with the second user device. By way of a non-limiting example, the first user device may include a microphone and associated voice recognition circuitry that may receive a voice input by the first user that corresponds to the authentication operation. By way of another non-limiting example, the first user device may include a camera and associated image processing circuitry that may receive image data of the first user (e.g., a head nod, hand cue, etc.) that corresponds to the authentication operation.

In some embodiments, as shown in operation 310, the system 130 may be further configured to iteratively authenticate the existing session between the first user device and the second user device based on iterative authentication operations by the first user responsive to iterative determinations of verifiable image objects associated with the second user during a time period associated with the existing session. As described above, in some embodiments, the request for data transfer may be associated with an existing session between the first user device and the second user device. In such an example embodiment, the system 130 may operate to, at a defined frequency, continuously authenticate the session between the first user device and the second user device. As would be evident to one of ordinary skill in the art in light of the present disclosure, the second user's device may be lost, misplaced, or otherwise accessible by a user other than the second user. In order to maintain the security associated with the authenticated session, the system 130 may iteratively perform the operations of FIGS. 2-3 to ensure that the second user is associated with the second user device. For example, the second user may be prompted periodically to provide an image (e.g., captured by the second user device or otherwise) during access to the authenticated session.

FIG. 4 illustrates a flowchart containing a series of operations for verifiable image object generation (e.g., method 400). The operations illustrated in FIG. 4 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 402, in some embodiments, the system 130 may be configured to determine the verifiable image object associated with the second user. As described above, the verifiable image objects described herein may refer to a collection of data entries indicative of or associated with an image of the second user. In some embodiments, for example, the verifiable image object may refer to an image, picture, video, and/or the like that is a digital representation of the physical embodiment of the second user. The verifiable image object may comprise data that, when rendered, illustrates an image of the face of the second user for view by the first user as described herein. Although described herein with reference to an image of the second user, the present disclosure contemplates that any data entries associated with the second user may be used by the embodiments herein as the verifiable image object. The determination of the verifiable image object for the second user may occur, for example, via operations 404 and 406 described hereafter.

In some embodiments, as shown in operation 404, the system 130 may be configured to cause the second user device to perform an image capture operation that generates the verifiable image object. For example, the system 130 may transmit instructions to the second user device that causes the second user device to capture an image of the second user. The image of the second user (e.g., the image data of the second user generated by the image capture operation) may be, in whole or in part, used to generate the verifiable image object. The present disclosure contemplates that the example image capture operation may be performed, in some embodiments, only in instances in which the second user has approved or otherwise provided access to the system 130 to cause performance of the image capture operation. In some instances, the system 130 may cause presentation of a user notification to the second user via the second user device that indicates that an image capture operation will occur for verification purposes. In such an example implementation, the second user may, for example, approve or prevent performance of the image capture operation.

Additionally or alternatively, in some embodiments, as shown in operation 406, the system 130 may be configured to access a database storing verifiable image objects associated with a plurality of users. As described above, users that interact with the system 130 may provide images or other digital representations that identify the underlying user associated with the images. The example database, for example, may store user pictures that are supplied to the system 130 as part of an initialization or other sign-up procedure. The system 130 may, in determining the verifiable image object, query the database to receive verifiable image objects stored by the database that are associated with the second user. Although described herein with reference to a database, the present disclosure contemplates that the system 130 may access or otherwise retrieve images, videos, attributes, characteristics, etc. associated with the second user from any source, prior interaction, and/or the like. In some embodiments, the verifiable image objects that are retrieved from the example database may be first provided to the second user (e.g., for approval or otherwise) before providing these verifiable image objects to the first user. Thereafter as shown in operation 408, the system 130 may be configured to authenticate the data transfer between the first user device and a second user device in response to an authentication operation by the first user based upon the verifiable image object as described above with reference to operation 212 in FIG. 2.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for image authenticated data transfers between electronic devices in a distributed network, the system comprising:
    at least one non-transitory storage device; and
    at least one processor coupled to the at least one non-transitory storage device, wherein the at least one processor is configured to:
        receive a request for data transfer from a first user device associated with a first user, wherein the data transfer request defines one or more data transfer parameters and is associated with an existing session between the first user device and a second user device;
        determine a second user associated with the data transfer request and the second user device based upon the one or more data transfer parameters;
        determine a first verifiable image object associated with the second user, wherein the first verifiable image object comprises at least a first digital representation of the second user;
        authenticate the data transfer between the first user device and the second user device associated with the second user in response to an authentication operation by the first user based upon the verifiable image object at a first time;
        determine a second verifiable image object associated with the second user, wherein the second verifiable image object comprises at least a second digital representation of the second user that is different from the first digital representation of the first verifiable image object; and
        authenticate the data transfer between the first user device and the second user device associated with the second user in response to an authentication operation by the first user based upon the second verifiable image object at a second time.

2. The system of claim 1, wherein the at least one processor is further configured to cause the first user device to render the first verifiable image object and the second verifiable image object on a display of the first user device.

3. The system of claim 1, wherein, in determining a second user associated with the data transfer request, the at least one processor is further configured to access one or more prior interactions between the first user device and the second user device.

4. The system of claim 1, wherein the at least one processor is further configured to:
    cause presentation of the first verifiable image object on a display of the first user device;
    receive one or more user inputs via a plurality of input objects provided on the display; and
    authenticate the data transfer between the first user device and a second user device associated with the second user in response to the one or more user inputs operating as the authentication operation.

5. The system of claim 1, wherein the at least one processor is further configured to iteratively authenticate the existing session between the first user device and the second user device based on iterative authentication operations by the first user responsive to iterative determinations of verifiable image objects associated with the second user during a time period associated with the existing session.

6. The system of claim 1, wherein the at least one processor is further configured to halt the existing session between the first user device and the second user device in the absence of an authentication operation by the first user.

7. The system of claim 1, wherein, in determining the first verifiable image object associated with the second user, the at least one processor is further configured to cause the second user device to perform a first image capture operation that generates the first verifiable image object.

8. The system of claim 1, wherein, in determining the first verifiable image object associated with the second user, the at least one processor is further configured to access a database storing verifiable image objects associated with a plurality of users.

9. The system of claim 1, wherein the second time is later in time than the first time.

10. The system of claim 7, wherein, in determining the second verifiable image object associated with the second user, the at least one processor is further configured to cause the second user device to perform a second image capture operation that generates the second verifiable image object.

11. A computer program product for image authenticated data transfers between electronic devices in a distributed network, the computer program product comprising a non-transitory computer-readable medium comprising code that, when executed, causes an apparatus to:

> receive a request for data transfer from a first user device associated with a first user, wherein the data transfer request defines one or more data transfer parameters and is associated with an existing session between the first user device and a second user device;
>
> determine a second user associated with the data transfer request and the second user device based upon the one or more data transfer parameters;
>
> determine a first verifiable image object associated with the second user, wherein the first verifiable image object comprises at least a first digital representation of the second user;
>
> authenticate the data transfer between the first user device and the second user device associated with the second user in response to an authentication operation by the first user based upon the verifiable image object at a first time;
>
> determine a second verifiable image object associated with the second user, wherein the second verifiable image object comprises at least a second digital representation of the second user that is different from the first digital representation of the first verifiable image object; and
>
> authenticate the data transfer between the first user device and the second user device associated with the second user in response to an authentication operation by the first user based upon the second verifiable image object at a second time.

12. The computer program product of claim 11, further comprising code that, when executed, causes the apparatus to:

> cause presentation of the first verifiable image object on a display of the first user device;
>
> receive one or more user inputs via a plurality of input objects provided on the display; and
>
> authenticate the data transfer between the first user device and a second user device associated with the second user in response to the one or more user inputs operating as the authentication operation.

13. The computer program product of claim 11, further comprising code that, when executed, causes the apparatus to iteratively authenticate the existing session between the first user device and the second user device based on iterative authentication operations by the first user responsive to iterative determinations of verifiable image objects associated with the second user during a time period associated with the existing session.

14. The computing program product of claim 11, further comprising code that, when executed, causes the apparatus to cause the second user device to perform a first image capture operation that generates the first verifiable image object.

15. The computing program product of claim 11, further comprising code that, when executed, causes the apparatus to access a database storing verifiable image objects associated with a plurality of users.

16. A method for image authenticated data transfers between electronic devices in a distributed network, the method comprising:

> receiving a request for data transfer from a first user device associated with a first user, wherein the data transfer request defines one or more data transfer parameters and is associated with an existing session between the first user device and a second user device;
>
> determining a second user associated with the data transfer request and the second user device based upon the one or more data transfer parameters;
>
> determining a first verifiable image object associated with the second user, wherein the first verifiable image object comprises at least a first digital representation of the second user;
>
> authenticating the data transfer between the first user device and the second user device associated with the second user in response to an authentication operation by the first user based upon the verifiable image object at a first time;
>
> determining a second verifiable image object associated with the second user, wherein the second verifiable image object comprises at least a second digital representation of the second user that is different from the first digital representation of the first verifiable image object; and
>
> authenticating the data transfer between the first user device and the second user device associated with the second user in response to an authentication operation by the first user based upon the second verifiable image object at a second time.

17. The method of claim 16, further comprising:

> causing presentation of the first verifiable image object on a display of the first user device;
>
> receiving one or more user inputs via a plurality of input objects provided on the display; and
>
> authenticating the data transfer between the first user device and a second user device associated with the second user in response to the one or more user inputs operating as the authentication operation.

18. The method of claim 16, further comprising causing the second user device to perform a first image capture operation that generates the first verifiable image object.

19. The method of claim 16, further comprising causing the apparatus to access a database storing verifiable image objects associated with a plurality of users.

*   *   *   *   *